United States Patent
Enzaki et al.

(10) Patent No.: US 6,796,545 B2
(45) Date of Patent: Sep. 28, 2004

(54) POPPET VALVE SEAL MECHANISM

(75) Inventors: Akira Enzaki, Tsukuba-gun (JP);
Toyonobu Sakurai, Tsukuba-gun (JP);
Mamoru Fukuda, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 107 days.

(21) Appl. No.: 10/245,315

(22) Filed: Sep. 18, 2002

(65) Prior Publication Data
US 2003/0052297 A1 Mar. 20, 2003

(30) Foreign Application Priority Data

Sep. 19, 2001 (JP) ........................................ 2001-285397
Nov. 15, 2001 (JP) ........................................ 2001-350545

(51) Int. Cl.$^7$ ............................................. F16K 25/00
(52) U.S. Cl. ..................................... 251/317; 251/363
(58) Field of Search ............................. 251/334–335.1, 251/363–364, 314, 316–317.01

(56) References Cited

U.S. PATENT DOCUMENTS

| | | | | |
|---|---|---|---|---|
| 3,386,699 A | * | 6/1968 | Petter et al. | ................ 277/399 |
| 3,618,893 A | * | 11/1971 | Bois | ............................ 251/359 |
| 4,015,818 A | * | 4/1977 | Tawakol | ..................... 251/307 |
| 4,316,598 A | * | 2/1982 | Maggio | ....................... 251/63 |
| 5,246,030 A | * | 9/1993 | Jerina | ........................ 137/478 |

* cited by examiner

Primary Examiner—Paul J. Hirsch
(74) Attorney, Agent, or Firm—Oblon, Spivak, McClelland, Maier & Neustadt, P.C.

(57) ABSTRACT

A poppet valve seal mechanism has a groove to which a seal member is mounted such that a width of an opening of the groove is smaller than a maximum width inside of the groove and a cross section area of the groove is smaller than that of the seal member. A maximum width of a portion of the seal member accommodated in the groove is greater than a width of the opening of the groove. A width of the opening is constant over its entire peripheral. An inner wall forming the inside of the groove is formed with communication holes and which bring the inside of the groove and the outside of the groove into communication with each other.

19 Claims, 6 Drawing Sheets

POPPET VALVE SEAL MECHANISM

TECHNICAL FIELD

The present invention relates to a poppet valve seal mechanism, and more particularly, to a valve seal mechanism which prevents the seal member from being separated in a two port valve which seals a poppet valve using a seal member.

PRIOR ART

Conventionally, as the poppet valve seal mechanism of this kind, there is a know mechanism as shown in FIG. 8 in which a valve body 1 is formed with a dovetail groove 2, a width of an opening 2a of the groove 2 is smaller than that of the inside of the groove, a seal member 4 which has rubber resiliency and which is brought into contact with a valve seat 3 under pressure is mounted into the groove 2 so that the seal member 4 is prevented from falling out from the groove 2.

According to such a poppet valve seal mechanism, however, when a pressure-contacting force of the seal member 4 with respect to the valve seat 3 is great, or when a seal member 4 which is easily deformed is used, as shown in FIG. 9, there is a problem that the seal member 4 is completely embedded into the groove 2, the valve body 1 and the valve seat 3 are brought into direct contact with each other, a so-called metal touch is generated.

This metal touch may cause metal powder by friction and wear and thus, the metal touch must be avoided as less as possible in equipment which requires clean environment such as a semiconductor producing apparatus.

DISCLOSURE OF THE INVENTION

It is a technical object of the present invention is to provide a poppet valve seal mechanism in which a seal member does not fall out from a groove, and the metal touch is not generated.

To achieve the above object, the present invention provides a poppet valve seal mechanism in which a valve seat is provided in a flow path, a valve body is allowed to move in a direction perpendicular to a valve seat surface of the valve body, thereby bringing the valve body into contact and away from the valve seat to open and close the flow path, wherein an annular seal member made of resilient body for sealing between the valve body and the valve seat is mounted to an annular groove provided in one of the valve seat and the valve body, the groove is formed such that a width of its opening is smaller than a maximum width of inside of the groove, and an area of cross section is smaller than that of the seal member, a maximum width of a portion of the seal member accommodated in the groove is formed larger than a width of the opening of the groove, the seal member projects from the opening of the groove in any of state in which the seal member is brought into contact with an opposed seal surface under pressure and a state in which the seal member is not brought into contact with the opposed seal surface under pressure.

With the above structure, it is possible to avoid a so-called metal touch in which the valve body 1 and the valve seat 3 in FIG. 9 are brought into direct contact with each other when the seal member is brought into contact with the opposed seal surface under pressure, and it is possible to prevent metal powder from being generated by friction and wear caused by the metal touch.

According to the invention, in the above poppet valve seal mechanism, the opening of the groove has a constant width over its entire periphery, the inside of the groove is formed of an inner wall and a pair of side wall surfaces which are connected from opposite ends of the bottom wall surface to the opening, the seal member has a cross section shape which forms a gap between inner walls extending from the bottom wall surface of the groove to the side wall surfaces, the side wall surfaces of the inner wall forming the gap is formed with a communication hole which bring the inside of the groove and an outside of the groove into communication with each other.

With the above structure, when the seal member is brought into contact with the opposed seal surface under pressure, the metal touch can be avoided and air in the gap formed between the seal member and the inner wall of the groove is allowed to guide outside the groove through the communication hole, and it is possible to bring the surface of the seal member and the inner wall of the groove into substantially close contact with each other. Therefore, with the synergism caused by narrowing the opening of the groove, it is possible to more reliably prevent the seal member from falling out from the groove when the seal member is separated from the opposed seal surface.

When the gap is formed between the seal member and the inner wall on an inner periphery of the groove and between the seal member and the inner wall of the outer periphery of the groove, it is preferable that the communication hole is formed in each of the side wall surface of the inner periphery and the side wall surface of the outer periphery.

The inside of the groove can be brought into communication with passages located on the opposite side of the valve body with each other by means of the communication holes.

In the above poppet valve seal mechanism, the valve body can be provided in the flow path which connects the two ports to each other, and one of the two ports can be connected to the vacuum pump.

A cross section of the seal member can be circular in shape.

It is more preferable that the following relations are established: B/A=0.80 to 0.95, B/D=0.70 to 0.85, E/A=0.25 to 0.35, wherein A is a diameter of the seal member, E is a length of a projecting portion of the seal member projecting from the groove, B is a width of the opening of the groove, and D is a width of the inside of the groove.

The poppet valve seal mechanism of the present invention can exhibit excellent sealing ability even if the seal member is made of any material, but the poppet valve seal mechanism is especially effective when the seal mechanism employs an O-ring or the like made of such resilient body that deformation caused by an external force is less prone to be restored, i.e., plastic deformation is easily maintained and the material is easily attached.

BRIEF DESCRIPTION OF THE INVENTION

DETAILED DESCRIPTION

Embodiments of the present invention will be explained in detail based on the drawings below.

Figure 1:
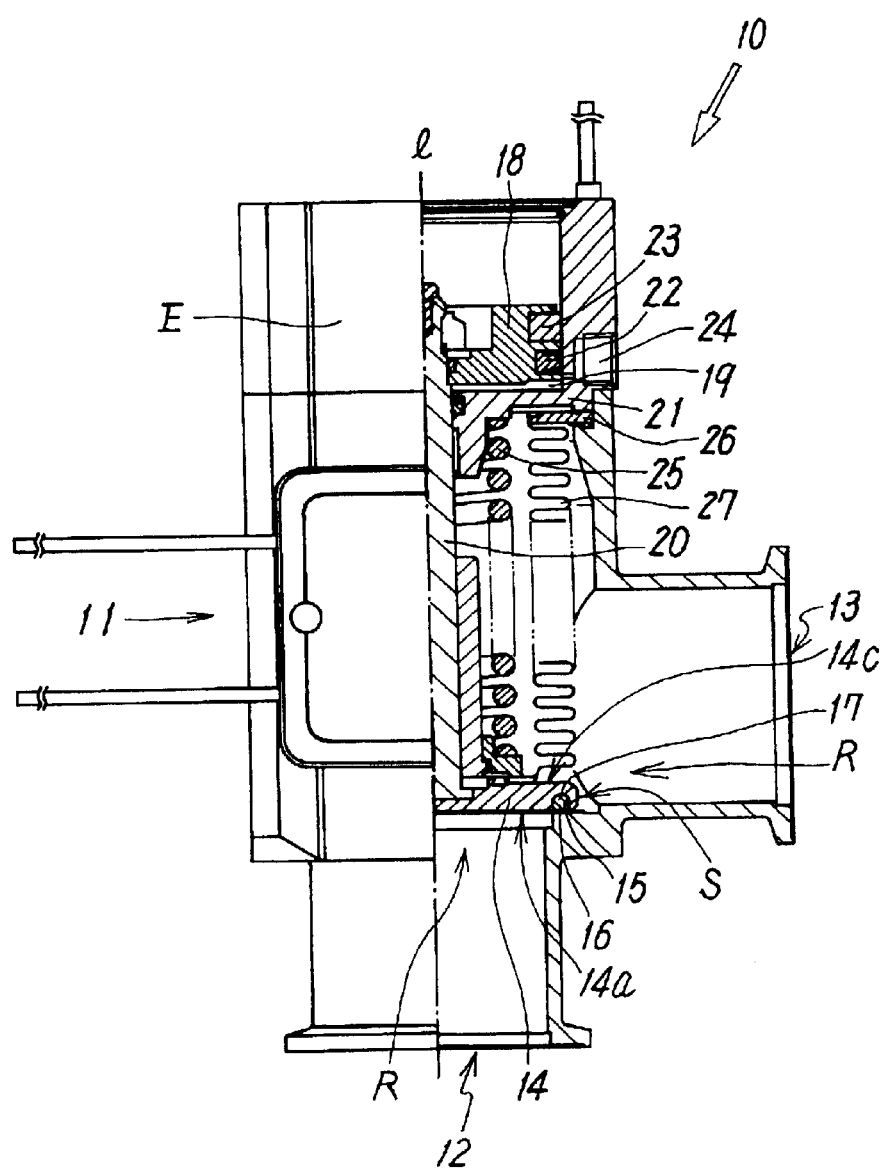
FIG. 1 is a vertical sectional view of an essential portion of a poppet valve having a seal mechanism according to a first embodiment of the present invention.

FIG. 1 shows a first embodiment of a poppet two-port valve according to the present invention. This poppet two-port valve 10 has a substantially cylindrical valve body 11. The valve body 11 is formed at its tip end in its axial direction with a first port 12 to be connected to a vacuum chamber (not shown). A second port 13 is formed in a direction perpendicular to an axial direction of the valve body 11. The second port 13 is to be connected to a vacuum pump (not shown). A valve mechanism for opening and closing a flow path R which connects the first and second ports 12 and 13 to each other is provided in the valve body 11.

The valve mechanism comprises a valve seat 16 formed in the flow path R which connects the ports 12 and 13 to each other, a valve body 14 which moves in an axial direction 1 of the valve body 11, i.e., in a direction perpendicular to the valve seat surface formed by said valve seat 16 to approach and separate from the valve seat 16, thereby opening and closing the valve mechanism, and an annular seal member S formed on an opposed surface 14a directed toward the valve seat 16 of the valve body 14.

The valve seat 16 is formed on a peripheral wall of the flow path R having the substantially circular cross section on the side of the first port 12. The valve body 14 is of substantially disk-like shape, and has a seal member S in the vicinity of a peripheral edge of an opposed surface 14a, and the opposed surface 14a is directed to the first port 12 and is disposed such as to be opposed to the valve seat 16. When the valve mechanism is closed, the seal member S abuts against the valve seat 16 which forms the opposed seal surface by a drive mechanism E, and when the valve mechanism is opened, the seal member S is separated from the valve seat 16.

The drive means E is mounted to a position opposite from the first port 12 of the valve body 11. The drive means E includes a piston 18 which is actuated by action of a fluid pressure to drive the valve body 14, a piston chamber 19 in which the piston 18 is slidably provided, and a valve shaft 20 which connects the valve body 14 and the piston 18 to each other and which extends in axially direction 1.

More specifically, a tip end of the valve shaft 20 is fitted into a substantially central portion of a back surface 14c located at a position opposite from the opposed surface of the valve body 14 and is fixed therein so that the valve shaft 20 is not pulled out, and a rear end of the valve shaft 20 air-tightly passes through a seating 21 which is a partition wall between the piston chamber 19 of the drive means E and the valve body 11. The rear end projects into the piston chamber 19 and is air-tightly connected to the piston 18.

The piston 18 it provided at its outer periphery with a packing 22 and a guide ring 23 which are air-tightly slide on an inner wall of the piston chamber 19. The piston chamber 19 between the piston 18 and the seating 21 is in communication with an operation port 24 formed in a side wall of the valve body 11.

A spring 25 which biases the valve body 14 in its closing direction is compressed between the valve body 14 and the seating 21 in the valve body 11. A bellows 27 enclosing the valve shaft 20 and the spring 25 to protect them is provided between the valve body 14 and a bellows holder 26 which is sandwiched between the seating 21 and an inner wall piece of the valve body 11.

The seal member S comprises an annular groove 15 and a seal member 17 made of resilient body whose deformation caused by relative external force is less prone to be returned. The groove 15 is formed in a periphery of the valve body 14 on the side of the opposed surface 14a. The seal member 17 is formed into an annular shape, and its cross section is substantially circular. The valve body 14 abuts against the valve seat 16, and when the valve mechanism is closed, the seal member 17 mounted into the groove 15 is brought into contact with the valve seat 16 under pressure so that a space between the valve body 14 and the valve seat 16 is sealed.

Figure 2:
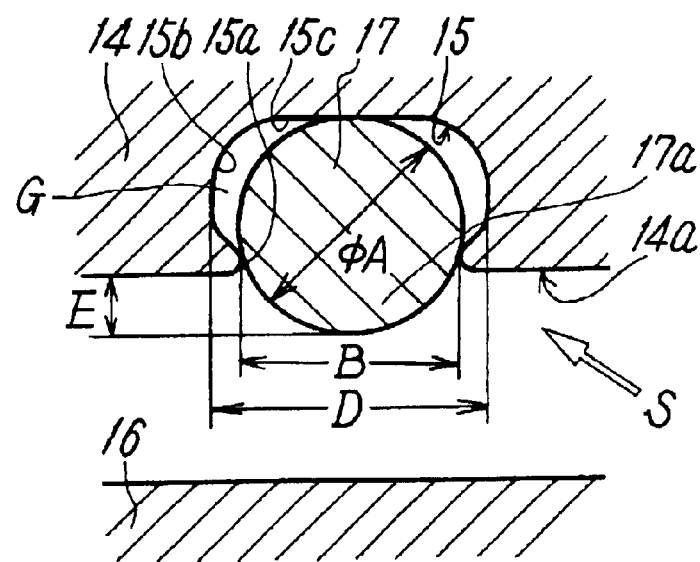
FIG. 2 is an enlarged sectional view of a poppet valve seal mechanism under no load according to the first embodiment of the invention.

As shown in FIG. 2, the groove 15 comprises an opening 15a which is opened at the opposed surface 14a, and an inside. The inside is formed by an inner wall comprising a bottom 15c, and a pair of sides 15b connected from opposite sides of the bottom 15c to the opening 15a. The groove 15 is formed such that it becomes maximum width at a position of the side 15b.

Both the sides 15b are connected to the bottom 15c and the opening 15a with smooth curve lines, and the opening 15a is smoothly connected to the opposed surface 14a.

Figure 3:
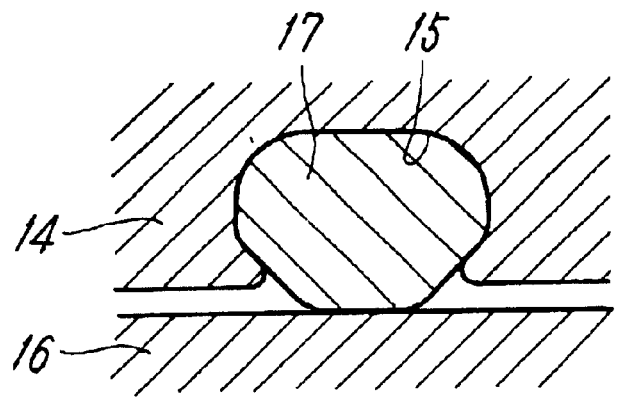
FIG. 3 is an enlarged sectional view of the poppet valve seal mechanism under no load according to the first embodiment of the invention.
Figure 4:
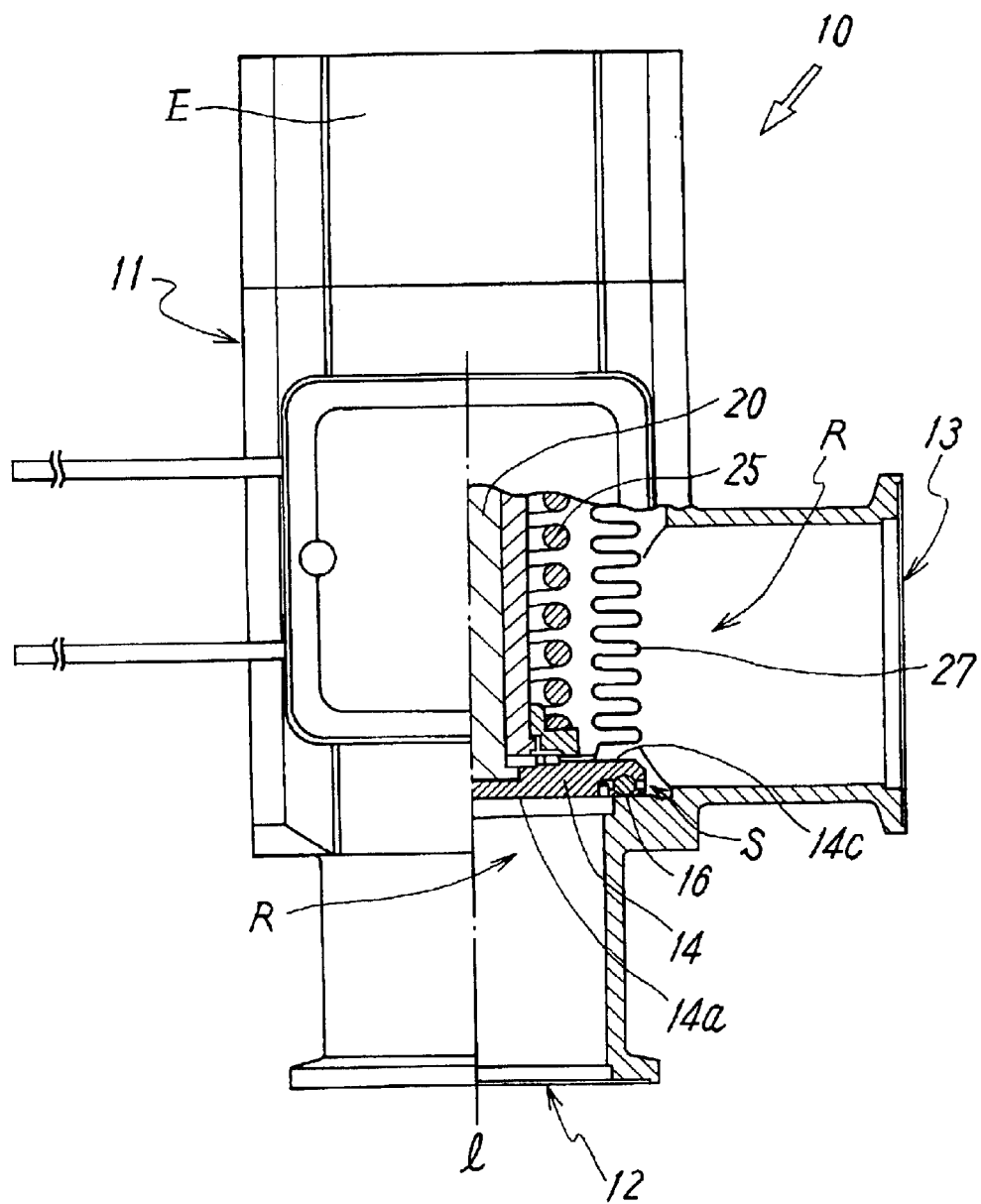
FIG. 4 is a vertical sectional view of an essential portion of a poppet valve having a seal mechanism according to a second embodiment of the invention.

A width of the opening 15a is smaller than a maximum width (diameter of cross section of the seal member 17) of a portion of the seal member 17 accommodated in the groove 15, and a maximum width of the inside is greater, i.e., a width of the opening 15a is smaller than a maximum width of inside the groove 15, and an area of cross section of the groove 15 is set smaller than that of the seal member 17. As shown in FIG. 3, when the seal member 17 is brought into contact with the valve seat 16 under pressure and the seal member 17 is compressed and deformed by a load at the time of the pressure contact, the seal member 17 always retains a state in which the seal member 17 projects outward by means of the groove 15 and the seal member 17 is not separated from the groove 15.

It has been confirmed by experiment made by the present inventor that the following concrete relation between the groove 15 and the seal member 17 is appropriate: B/A=0.80 to 0.95, B/D=0.70 to 0.85, E/A=0.25 to 0.35, wherein A is a diameter of the seal member 17 under no load, E is a length of a projecting portion 17a of the seal member projecting from the groove 15, B is a width of the opening 15a of the groove 15, and D is a width of the inside of the groove 15 in FIG. 2.

Since the poppet two-port valve has the above structure, the seal member 17 is usually brought into contact with the valve seat 16 under pressure by the biasing force of the compressed spring 25, and the valve body 14 closes the flow path R. In this state, even if the vacuum pump is driven, gas in the vacuum chamber is not discharged from the first port 12 to the second port 13.

If a pressurized fluid such as compressed air or the like is pressurized and supplied to the piston chamber 19 from the operation port 24, a fluid pressure in the piston chamber 19 rises and the valve body 14 is moved toward a rear end of the valve body 11 together with the piston 18 against a resilient force of the spring 25 and with this, the seal member 17 is separated from the valve seat 16, and the flow path R is opened.

If the pressurized fluid in the piston chamber 19 is discharged from the operation port 24, the valve body 14 is restored by a biasing force of the spring 25, the seal member 17 is brought into contact with the valve seat 16 under pressure, and the flow path R is closed.

In the seal mechanism of the poppet two-port valve, the maximum width (cross section diameter) of the seal member 17 accommodated in the groove 15 is greater than a width of the opening 15a. If the seal member 17 is mounted into the groove 15 whose maximum width therein is narrower than a width of the opening 15a, the seal member 17 is brought into contact with the valve seat 16 when the valve body 14 is closed, and even if the seal member 17 is pulled by the valve seat 16 in a direction in which the seal member 17 is separated from the groove 15 by the stuck valve seat 16 when the valve body 14 is opened, the seal member 17 is prevented from being separated from the groove 15 of the seal member 17 by the narrow opening 15a.

Further, since the cross section area of the seal member 17 is set such that the area becomes greater than that of the groove 15, the seal member 17 is brought into contact with the valve seat 16 and receives a load, and the seal member 17 is compressed and deformed, and even if the seal member 17 is pushed into the groove 15, the seal member 17 always retains a state in which the seal member 17 projects outward from the groove 15. Since a clearance is formed between the valve body 14 and the valve seat 16 (see FIG. 3), even if a material whose deformation caused by external force is relatively less prone to be restored to the original shape, i.e., a resilient material whose plastic deformation is relatively prone to be maintained is used as a material of the seal member 17, the metal touch is reliably avoided.

In the seal mechanism of the poppet two-port valve according to the first embodiment, the gap G exists between the seal member 17 and the inner wall of the groove 15, and when the valve body 14 abuts against the valve seat 16 as shown in FIG. 3, the seal member 17 is deformed and pushed into the groove 2, and air enclosed in the gap G is compressed. With this, when the valve body 14 is separated from the valve seat 16, a repulsion force for pushing the seal member 17 from the groove 15 is generated by air compressed in the gap G. Therefore, in order to prevent the seal member 17 from separating from the groove 15, it is preferable to eliminate the gap G to bring a surface of the seal member 17 into close contact with the inner wall of the groove 15.

Figure 10:
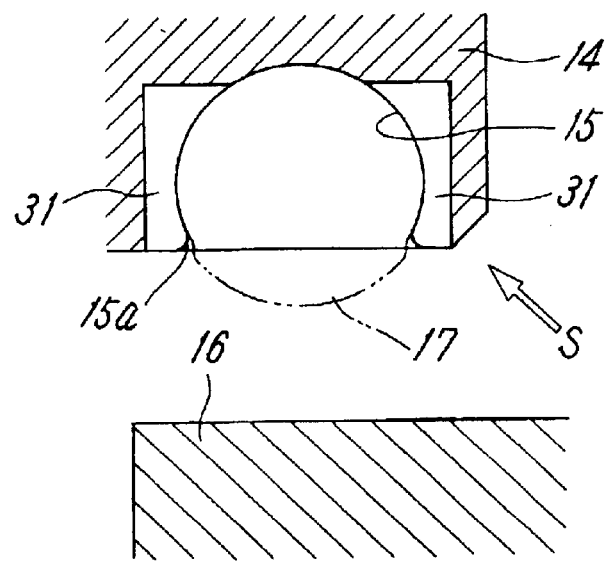
FIG. 10 is an enlarged sectional view of a groove in a poppet valve seal mechanism previously developed by the present inventor, taken along a line II—II in FIG. 11.
Figure 11:
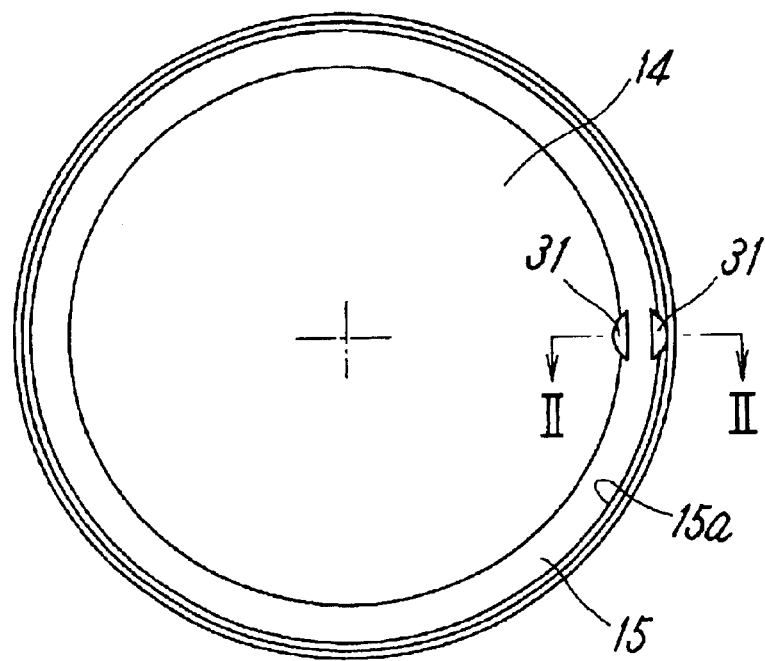
FIG. 11 is an enlarged view of a valve body of a poppet valve seal mechanism previously developed by the present inventor as viewed from its bottom.

Thereupon, the present inventor developed a valve seal mechanism as shown in FIGS. 10 and 11. The seal member S in this valve seal mechanism comprises the seal member 17 having a cross section area greater than the groove 15 formed in the valve body 14, and the groove 15 having the opening 15a whose width is smaller than the maximum width of the inside of the groove 15 and having the inner wall which has a shape which is brought into substantially tight contact with an outer surface of the seal member 17. With this design, the gap formed between the outer surface of the seal member 17 and the inner wall of the groove 15 is restrained as small as possible. However, it is practically difficult to eliminate the gap perfectly and thus, a notch 31 for releasing air in the gap out from the groove 15 when the seal member 17 is brought into contact with the valve seat 16 is formed by forming a columnar notch having a diameter greater than the maximum width of the groove 15 from the opening 15a side of the groove 15.

In the valve seal mechanism, however, the opening 15a which is narrowed so as to prevent the seal member 17 from separating is cut in a position where the notch 31 of the groove 15 is formed, and the opening width is greater than the maximum width, i.e., a diameter of the seal member 17. Therefore, it was found that there was an adverse possibility that the seal member 17 was removed from the groove 15 from the position where the notch 31 was provided due to the sticking of the seal member 17, and it was impossible to sufficiently prevent the seal member 17 from separating from the groove 15.

A second embodiment of the present invention shown in FIGS. 4 to 7 has been developed in view of such a problem. In the second embodiment, it is possible to prevent the metal touch, to reliably prevent the seal member 17 from separating from the groove 15, and to more stably and excellently seal between the valve body 14 and the valve seat 16.

The same structure as that of the first embodiment is designated with the same reference symbols in the drawings, and explanation thereof is omitted to avoid overlaps.

Figure 5:
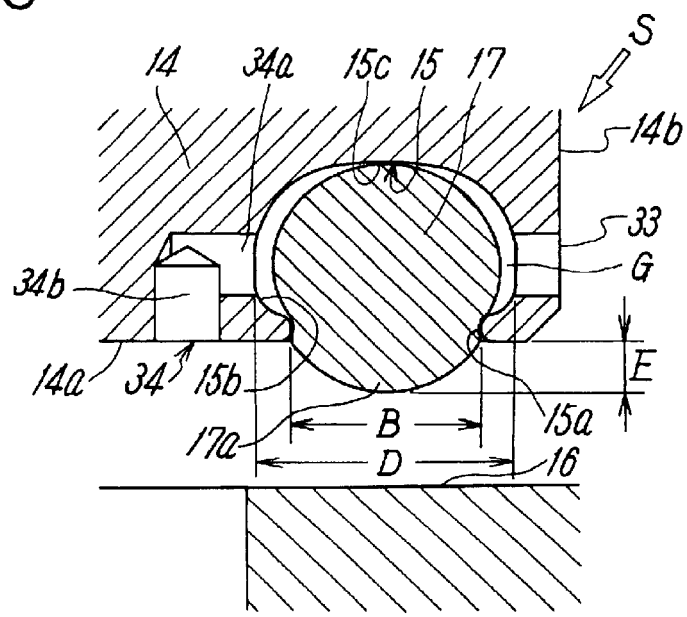
FIG. 5 is an enlarged sectional view of a poppet valve seal mechanism according to the second embodiment of the invention, taken along a I—I line in FIG. 7.
Figure 6:
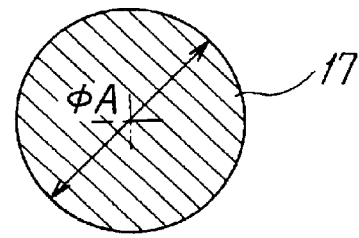
FIG. 6 is an enlarged sectional view of a seal member used in the poppet valve seal mechanism of the second embodiment of the invention.
Figure 7:
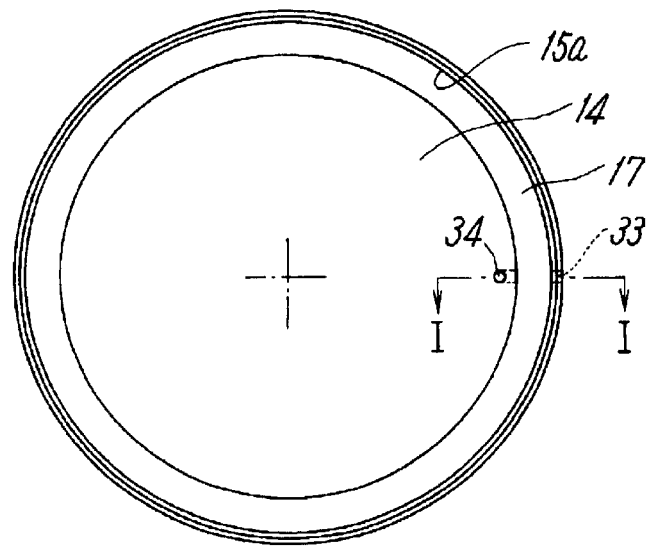
FIG. 7 is an enlarged view of the valve body of the second embodiment of the invention as viewed from its bottom.
Figure 8:
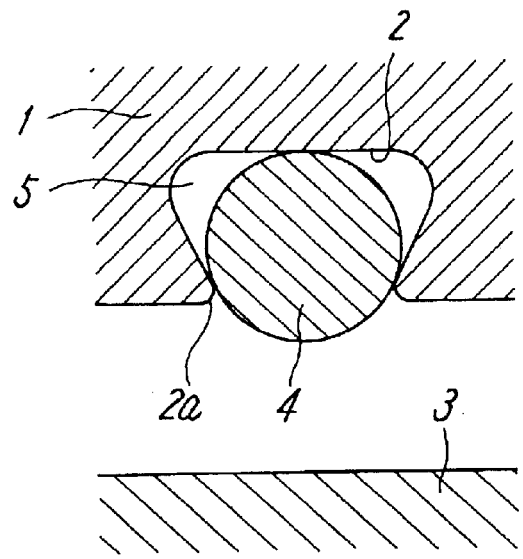
FIG. 8 is an enlarged sectional view of a conventional poppet valve seal mechanism under no load.
Figure 9:
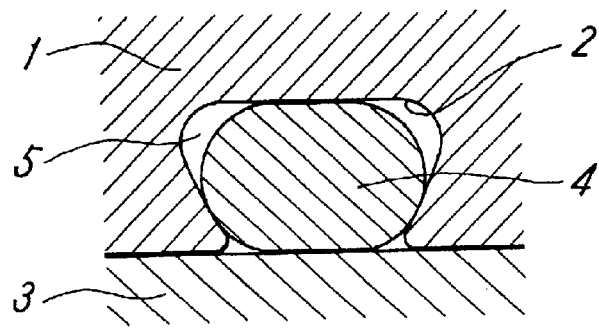
FIG. 9 is an enlarged sectional view of the conventional poppet valve seal mechanism under no load.

In this embodiment, instead of the seal member S, a seal member 17 having the same size with respect to the groove 15 of the same size as that in the first embodiment is mounted as shown in FIGS. 5 to 7, and communication holes 33 and 34 which bring the inside of the groove 15 and the outside of the groove 15 into communication with each other are formed in the inner wall which forms the inside of the groove 15.

That is, in this embodiment, in the poppet two-port valve seal mechanism of the first embodiment, the inner wall of the groove 15 is formed with the communication holes 33 and 34 which bring the inside of the groove 15 and the outside of the groove 15 into communication with each other.

When the valve mechanism is closed and the seal member 17 is brought into contact with the valve seat 16, the communication holes 33 and 34 which brings the inside and outside of the groove 15 into communication with each other release out the air in the gap G formed between the surface of the seal member 17 and the inner wall of the groove 15. The communication holes 33 and 34 comprise a first communication hole 33 and a second communication hole 34 which bring the inside of the groove 15, the side surface 14b of the valve body 14 and the opposed surface 14a of the valve body 14 into communication with each other.

More specifically, the first communication hole 33 is formed of a through hole which passes from the side 15b located on the outer periphery of the groove 15 to the side surface 14b of the valve body 14. The second communication hole 34 is formed of a side hole 34a formed in the side 15b located on the inner periphery of the groove 15 coaxially with the first communication hole 33, and vertical through hole 34b passing from a tip end of the side hole 34a to the opposed surface 14a of the valve body 14. The inside of the groove 15 is in communication with the flow path R on the side of the second port 13 through the first communication hole 33, and is in communication with the flow path R on the side of the first port 12 through the second communication hole 34.

If the valve body 14 is allowed to abut against the valve seat 16 so as to close the valve mechanism, a projection 17a of the seal member 17 is brought into contact with the valve seat 16 under pressure, the seal member 17 is deformed and pushed into the groove 15, and the groove 15 is filled with the seal member 17. Therefore, air in the gap G formed between the inner wall of the groove 15 and the seal member 17 is pushed outside through the communication holes 33 and 34, a surface of the seal member 17 is brought into substantially close contact with the inner wall of the groove 15.

With this structure, when the valve body 14 is separated from the valve seat 16, it is possible to suppress the repulsion force caused by the compressed air in the gap G. This repulsion force acts on the seal member 17 in a direction pushed out from the groove 15. Further, since the seal member 17 is held in the groove 15 by the narrow opening 15a of the groove 15, it is possible to more reliably prevent the seal member 17 from being separated from the groove 15.

Further, as in the first embodiment, since the cross section area of the seal member 17 is set greater than that of the groove 15, the seal member 17 is brought into contact with the valve seat 16, receives a load and is compressed and deformed, and even if the seal member 17 is pushed into the groove 15, the seal member 17 is always retained in a state in which the seal member 17 projects outward from the groove 15, and the clearance is formed between the valve body 14 and the valve seat 16 (see FIG. 3) and thus, even if a material whose deformation caused by external force is relatively less prone to be restored to the original shape, i.e., a resilient material whose plastic deformation is relatively prone to be maintained is used as a material of the seal member 17, the metal touch is reliably avoided.

Although embodiments of the poppet two-port valve seal mechanism of the present invention have been described above, the present invention is not limited to each of the embodiments, and the invention can variously be modified in design without departing a spirit of the invention described in claims of the present invention.

The poppet two-port valve seal mechanism of the embodiment may be the seal member 17 made of any resilient material, and excellent sealing ability can be exhibited, and it is especially effective when the seal mechanism employs an O-ring or the like made of such resilient body that deformation caused by an external force is less prone to be restored, i.e., plastic deformation is easily maintained and the material is easily attached.

The two-port valve has been explained in the embodiment, the present invention is not limited to this, and the invention can also be applied to other poppet two-port valve seal mechanisms of course.

Further, although the valve body 14 is formed with the seal member S, even if the seal mechanism is formed such that the same seal member 25 is formed on the side of the valve seat 26 and the opposed surface 14a of the valve body 14 is formed as the opposed seal surface, the same effect can be obtained.

According to the poppet two-port valve seal mechanism of the first invention described in detail above, since the seal member is mounted in the groove having the narrow opening, the seal member is not separated from the groove. Further, since the cross section area of the seal member is set greater than that of the groove, the seal member is always in a state in which the seal member projects from the groove, the metal touch can be avoided, and excellent sealing ability can be secured.

According to the poppet two-port valve seal mechanism of the second invention of the present application, in addition to the effect of the first invention, when the valve body abuts against the valve seat and the seal member is strongly brought into contact with the valve seat under pressure, even if the seal member made of resilient body is pushed into the groove, air in the gap formed between the seal member and the inner wall of the groove escapes out from the groove through the communication holes, and the surface of the seal member is brought into substantially contact with the inner wall of the groove. Therefore, when the valve body is separated from the valve seat, it is possible to suppress the repulsion force caused by the compressed air in the gap which acts on the seal member in a direction pushing out from the groove. Therefore, it is possible to more reliably prevent the seal member from being pushed out from the groove and separated therefrom, and it is possible to stably obtain excellent sealing ability between the valve body and the valve seat.

What is claimed is:

1. A poppet valve seat mechanism in which a valve seat is provided in a flow path, a valve body is allowed to move in a direction perpendicular to a valve seat surface of the valve body, thereby bringing the valve body into contact and away from the valve seat to open and close the flow path, the poppet valve seal mechanism comprising:

an annular resilient seal member configured to seal between the valve body and the valve seat; and an annular groove provided in one of the valve seat and the valve body, wherein the annular seal member is mounted to the annular groove, the groove is formed such that a width of an opening of the groove is smaller than a maximum width inside of the groove, a cross-sectional area of the groove is smaller than a cross-sectional area of the seal member, a maximum width of a portion of said seal member accommodated in the groove is formed larger than a width of the opening of the groove, and said seal member fills the groove and projects from the opening of the groove when the seal member is brought into contact with an opposed seal surface under pressure.

2. A poppet valve seal mechanism according to claim 1, wherein the opening of the groove has a constant width over an entire periphery of the groove, the inside of the groove is formed of an inner wall and a pair of side wall surfaces which are connected from opposite ends of the bottom wall surface to the opening, the seal member has a cross section shape which forms a gap between inner walls extending from the bottom wall surface of the groove to the side wall surfaces, the side wall surfaces of the inner wall forming the gap is formed with communication holes which bring the inside of the groove and an outside of the groove into communication with each other.

3. A poppet valve seal mechanism according to claim 2, wherein the gap is formed between the seal member and the inner wall on an inner periphery of the groove and between the seal member and the inner wall of the outer periphery of the groove, and each of the communication holes is formed in each of the side wall surface of the inner periphery and the side wall surface of the outer periphery.

4. A poppet valve seal mechanism according to claim 2 or 3, wherein the inside of the groove brings into communication a first flow path on a first side of the valve body with a second flow path on a second side of the valve body by means of the communication holes.

5. A poppet valve seal mechanism according to claim 1, wherein the valve body is provided in a flow path connecting two ports, one of the two ports is connected to a vacuum pump.

6. A poppet valve seal mechanism according to any one of claims 1 to 3, wherein said seal member has a substantially circular cross section.

7. The poppet valve seal mechanism according to claim 6, wherein B/A=0.80 to 0.95, B/D=0.70 to 0.85, E/A=0.25 to 0.35, where A is a diameter of the seal member, E is a length of a projecting portion of the seal member projecting from the groove, B is a width of the opening of the groove, and D is a width of the inside of the groove.

8. The poppet valve seal mechanism according to claim 1, wherein right and left side wall surfaces of the groove connect to a bottom wall surface and the opening of the groove through a smooth curved surface, a maximum width of the groove is located on a position of the left and right side wall surfaces, and the maximum width of the groove is greater than a depth of the groove.

9. The poppet valve seal mechanism according to claim 8, wherein communication holes are formed in the right and left side wall surfaces of the groove on the position of the maximum width of the groove.

10. A poppet valve seal mechanism, comprising:
an annular resilient seal member configured to seal between a valve body and a valve seat; and
an annular groove provided in one of the valve seat or the valve body, wherein B/A=0.80 to 0.95, B/D=0.70 to 0.85, and E/A=0.25 to 0.35, where A is a diameter of the seal member, E is a length of a projecting portion of the seal member projecting from the groove, B is a width of the opening of the groove, and D is a width of the inside of the groove.

11. A poppet valve seal mechanism according to claim 10, wherein the opening of the groove has a constant width over an entire periphery of the groove.

12. A poppet valve seal mechanism according to claim 11, wherein the inside of the groove is formed of an inner wall and a pair of side wall surfaces which are connected from opposite ends of the bottom wall surface to the opening.

13. A poppet valve seal mechanism according to claim 12, wherein the seal member has a cross section shape which forms a gap between inner walls extending from the bottom wall surface of the groove to the side wall surfaces.

14. A poppet valve seal mechanism according to claim 13, wherein the side wall surfaces of the inner wall forming the gap is formed with communication holes which bring the inside of the groove and an outside of the groove into communication with each other.

15. A poppet valve seal mechanism according to claim 14, wherein the gap is formed between the seal member and the inner wall on an inner periphery of the groove and between the seal member and the inner wall of the outer periphery of the groove.

16. A poppet valve seal mechanism according to claim 15, each of the communication holes is formed in each of the side wall surface of the inner periphery and the side wall surface of the outer periphery.

17. A poppet valve seal mechanism according to claim 16, wherein the inside of the groove brings into communication a first flow path on a first side of the valve body with a second flow path on a second side of the valve body by means of the communication holes.

18. A poppet valve seal mechanism according to claim 10, wherein the valve body is provided in a flow path connecting two ports, one of the two ports is connected to a vacuum pump.

19. A poppet valve seal mechanism according to claim 18, wherein said seal member has a substantially circular cross section.

* * * * *